(12) United States Patent
Sakoda (10) Patent No.: US 11,717,007 B2
(45) Date of Patent: Aug. 8, 2023

(54) CAT FOOD

(71) Applicant: Unicharm Corporation, Ehime (JP)

(72) Inventor: Junya Sakoda, Itami (JP)

(73) Assignee: Unicharm Corporation, Ehime (JP)

( * ) Notice: Subject to any disclaimer, the term of this patent is extended or adjusted under 35 U.S.C. 154(b) by 362 days.

(21) Appl. No.: 16/884,493

(22) Filed: May 27, 2020

(65) Prior Publication Data

US 2020/0288749 A1 Sep. 17, 2020

Related U.S. Application Data (63) Continuation of application No. PCT/JP2018/017512, filed on May 2, 2018.

(30) Foreign Application Priority Data

Nov. 29, 2017 (JP) ................. 2017-228804

(51) Int. Cl.
  *A23K 10/30* (2016.01)
  *A23K 40/25* (2016.01)
  *A23K 50/42* (2016.01)

(52) U.S. Cl.
  CPC ............ *A23K 10/30* (2016.05); *A23K 40/25* (2016.05); *A23K 50/42* (2016.05)

(58) Field of Classification Search
  CPC ...... A23K 50/42; A23K 10/30; A23K 20/158; A23K 40/25; A23K 20/147; A23K 40/30
  See application file for complete search history.

(56) References Cited

U.S. PATENT DOCUMENTS

| 2009/0280216 A1 | 11/2009 | Fumita |
| 2014/0093621 A1 | 4/2014 | Sakoda et al. |
| 2015/0296837 A1 | 10/2015 | Reiser et al. |
| 2018/0271117 A1* | 9/2018 | Sakoda ............... A23K 50/00 |

FOREIGN PATENT DOCUMENTS

| CN | 106922119 A | 7/2017 |
| EP | 3378329 A1 | 9/2018 |
| JP | H2-124064 A | 5/1990 |
| JP | H07-059516 A | 3/1995 |
| JP | 2002-238469 A | 8/2002 |
| JP | 2002-346506 A | 12/2002 |
| JP | 2009-268415 A | 11/2009 |

(Continued)

OTHER PUBLICATIONS

International Search Report issued in International Application No. PCT/JP2017/033745 dated Dec. 12, 2017, with translation (5 pages).

(Continued)

*Primary Examiner* — Jianfeng Song
(74) *Attorney, Agent, or Firm* — Osha Bergman Watanabe & Burton LLP (57) ABSTRACT

Cat food includes: food granules including extruded puffed granules having a moisture content of 12% or less. 60% or more of the food granules have a hardness of 2.5 kgw or less 1 minute after being immersed in a dilute hydrochloric acid (pH of 2.5) at 25° C. for 10 minutes. A pepsin digestibility of the food granules, 1 minute after being immersed in a 500 U/mL pepsin hydrochloric acid solution at 38° C. for 4 hours, is 60% or more.

11 Claims, 3 Drawing Sheets

(56) References Cited

FOREIGN PATENT DOCUMENTS

| | | |
|---|---|---|
| JP | 2014-079238 A | 5/2014 |
| JP | 2014-533501 A | 12/2014 |
| JP | 5752310 B1 | 7/2015 |
| JP | 2015-533279 A | 11/2015 |
| JP | 5813688 B2 | 11/2015 |
| JP | 5943368 B1 | 7/2016 |
| JP | 2016-198090 A | 12/2016 |
| WO | 2004/080198 A2 | 9/2004 |
| WO | 2013/095323 A1 | 6/2013 |
| WO | 2014/066438 A1 | 5/2014 |

OTHER PUBLICATIONS

"Puffed Rice", Database GNPD [Online], Oct. 25, 2013 (Oct. 15, 2013), XP055597112, retrieved from www.gnpd.com. Database accession No. 2204059, Mintel (2 pages).

"Recipe for Indoor Cats", Database GNPD [Online], Jul. 8, 2008 (Jul. 8, 2008), XP055597190, retrieved from www.gnpd.com, Database accession No. 942073, Mintel, (3 pages).

"Oral Sensitive Cat Food", Database GNPD [Online), Dec. 9, 2004 (Dec. 9, 2004, XP055597191, retrieved from www.gnpd.com, Database accession No. 323009, Mintel (2 pages).

Extended European Search Report issued in European Patent Application No. 17855835.9 dated Jul. 2, 2019 (10 pages).

Office Action issued in U.S. Appl. No. 16/336,908, dated Sep. 1, 2021 (20 pages).

Office Action (Requirement for Election/Restriction) issued in U.S. Appl. No. 16/336,908, dated Jun. 17, 2021 (11 pages).

Office Action issued in the counterpart Chinese Patent Application No. 201780059062.1, dated Feb. 22, 2022 (13 pages).

International Search Report issued in corresponding International Application No. PCT/JP2018/017512 dated May 29, 2018, with translation (4 pages).

Notice of Reasons for Rejection issued in corresponding Japanese Patent Application No. 2018-090785 dated May 22, 2018, with translation (6 pages).

\* cited by examiner

CAT FOOD

CROSS-REFERENCE TO RELATED APPLICATIONS

This application claims priority to Japanese Patent Application No. 2017-228804, filed on Nov. 29, 2017, the content of which is incorporated herein by reference.

TECHNICAL FIELD

The present invention relates to cat food.

BACKGROUND ART

Dry food having a moisture content of about 10% by weight or less is produced and sold as pet food that offers comprehensive nutrition and satisfies nutritious food standards for cats. Dry food is mainly used as a cat food for its excellent preservability, easy adjustment of nutritional components, and low cost.

CITATION LIST

Patent Literature

[PTL 1] Published Japanese Translation No. 2014-533501 of the PCT International Publication However, dry food may be difficult to digest. Attempts to improve digestibility of dry food have been insufficient because dry food enters the stomach as a solid and requires a lot of time to digest.

PTL 1 discloses a pet food composition in which the digestibility of dry food is improved and fecal quality of animals is enhanced by devising a mixture mainly composed of highly digestible starch and vegetable protein. However, the pet food composition of PTL 1 still has room for improvement in digestibility in the stomach after eating.

SUMMARY

One or more embodiments of the invention provide cat food with improved digestibility in the stomach after eating.

(1) Cat food according to one or more embodiments provide comprehensive nutrition and satisfies nutritious food standards for cats. The cat food includes:

puffed granules formed by extruding using an extruder (i.e., extruded puffed granules), in which a moisture content of the puffed granules is 12% or less, 60% or more of food granules in the entire food granules constituting the cat food have a hardness of 2.5 kgw or less immediately after being immersed in a dilute hydrochloric acid (pH of 2.5) at 25° C. for 10 minutes, and a pepsin digestibility thereof immediately after being immersed in a 500 U/mL pepsin hydrochloric acid solution at 38° C. for 4 hours is 60% or more.

(2) The cat food according to (1), in which a pepsin digestibility immediately after being immersed in a 500 U/mL pepsin hydrochloric acid solution at 38° C. for 16 hours is 80% or more.

(3) The cat food according to (1) or (2), in which a content of granules having a surface of which an arithmetic mean surface roughness Sa as measured using an L filter of a nesting index 0.25 mm is 14 μm or more is 60% or more.

(4) The cat food according to any one of (1) to (3), in which a content of a high water-absorbing resin is 0.5% to 15% by weight.

(5) The cat food according to (4), in which the high water-absorbing resin is lignocellulose.

(6) The cat food according to (4), in which the high water-absorbing resin is a refined cellulose having an average grain size of 50 μm or more.

According to one or more embodiments of the present invention, it is possible to provide a cat food of which digestibility in the stomach after eating is improved.

DETAILED DESCRIPTION

In the present disclosure, the term "pets" may generally refer to animals that have been bred by people. In a narrower sense, pets may be animals being cared for by their owners. Further, the term "pet food" indicates food for pets. Pet food can be sold as "animal feed" or "animal food".

In the present disclosure, a pet food granule body may refer to a set of granules used as part or all of the pet food. In the present disclosure, the granules constituting the pet food granule body are also referred to as "food granules".

In the present disclosure, the expression "coated with" fats and oils may indicate that fats and oils are applied onto a surface of the food granules and allowed to adhere to the food granules, and includes a case where part or all of the applied fats and oils infiltrate into the food granules (the food granules are impregnated with fats and oils).

[Method of Measuring Moisture Content]

According to one or more embodiments, a value of a moisture content is a value obtained by a normal-pressure heat-drying method.

For example, an object to be measured is pulverized using a pulverizer so as to pass through a sieve having an opening diameter of 1 mm and then used as a sample. 2 to 5 g of the analytical sample is accurately weighed and placed into an aluminum weighing dish (pre-dried and accurately weighed), and then dried at 135±2° C. for 2 hours. After air cooling in a desiccator, the weight is accurately measured, and a moisture content is calculated from a weight difference before and after drying.

A mass (W1 gram) of an aluminum weighing can is measured in advance as a constant weight value. The sample is put into the aluminum weighing can and the mass (W2 gram) is weighed. Next, the sample is dried under conditions of 135° C. for 2 hours using a forced circulation type hot air drier. After air cooling in a dry atmosphere (in a silica gel desiccator) and the mass thereof (W3 gram) is weighed. The moisture content is calculated from the obtained respective mass using the following equation.

Moisture content (unit: % by mass)=$(W2-W3)/(W2-W1) \times 100$

[Method of Measuring Hardness]

According to one or more embodiments, the hardness (breaking hardness) of the food granules constituting the cat food is a value obtained by the following measuring method.

Breaking stress at the time of being compressed at a constant compression rate is measured under the following conditions using a compression tester (EZ-TEST, model No: EZ-500NSX, manufactured by Shimadzu Corporation).

Plunger: plunger in a column shape having a diameter of 20 mm, platform: flat dish, compression rate: 60 mm/min, the lowest point of plunger: 1.5 mm (gap between flat dish and plunger), measurement temperature: 25° C.

For example, one food granule to be measured is placed on the flat dish and the stress is measured while a plunger is vertically pressed from the top of the food granules at a constant rate. A peak value (absolute maximum value) of the stress is read as a value of the breaking stress.

In addition, the numerical value unit of the breaking hardness can be converted into newton (N) by multiplying the numerical value of the breaking stress (unit: kgw) measured using the above-described compression tester by 9.8.

In a case where the cat food according to one or more embodiments provides comprehensive nutrition and satisfies nutritious food standards for cats, the mixture of raw materials is not particularly limited. It is preferable that the composition thereof is set such that the nutritional composition of the food granules to be obtained is satisfied and excellent formability is obtained.

The cat food according to one or more embodiments contains puffed granules formed by extruding using an extruder. The "puffed granules" may refer to granules obtained by forming a mixture of raw materials in a granule shape, and are granules obtained through a puffing step of foaming inside the mixture of raw materials. The "puffing step" may refer to a step of generating a gas inside the mixture of raw materials by methods such as heating, fermentation, chemical reaction or decompression. In the puffing step, a volume of the mixture of raw materials is increased by the generation of a gas, and it becomes porous properties. The bulk density decreases as the volume of the mixture of raw materials increases. The "puffed granules" are obtained by forming the mixture of raw materials in the granule shape before the puffing step, after the puffing step, or simultaneously with the puffing step. "Non-puffed granules" may refer to granules manufactured without going through the puffing step.

The moisture content of the puffed granules contained in the cat food according to one or more embodiments is 12% by mass or less, preferably 3% to 12% by mass, more preferably 5% to 12% by mass, and still more preferably 8% to 10% by mass. In a case where the moisture content is the lower limit or more of the above range, sufficient water absorbing properties can be obtained. On the other hand, in a case where the moisture content is the upper limit or less of the above range, sufficient palatability can be obtained.

Among the entire food granules constituting the cat food according to one or more embodiments, 60% or more of the food granules include 60% or more of granules having a hardness of 2.5 kgw or less immediately after being immersed in a dilute hydrochloric acid (pH of 2.5) at 25° C. for 10 minutes. In the present disclosure, the expression "immediately after being immersed" indicates 1 minute after the cat food is taken out from the dilute hydrochloric acid.

The dilute hydrochloric acid is a dilute hydrochloric acid obtained by adding several drops of 1 N (newton) of hydrochloric acid dropwise to distilled water and adjusting the pH thereof to 2.5 (25° C.).

The hardness of the food granules immersed in the dilute hydrochloric acid for 10 minutes is considered to correspond to the hardness of the eaten food granules in the stomach. In a case where the hardness thereof is 2.5 kgw or less, physical stimulation to a stomach wall is reduced so that digestibility in the stomach after eating can be improved. The lower limit of the hardness is 0.0 kgw (measuring precision or less).

As described above, by containing 60% or more of the food granules which are softened in the dilute hydrochloric acid, digestibility improvement effect in the stomach after eating the cat food can be sufficiently obtained.

Among the entire food granules constituting the cat food according to one or more embodiments, the food granules having the hardness of 2.5 kgw or less are preferably 65% by mass or more, more preferably 70% by mass or more, more preferably 80% by mass or more, and still more preferably 90% by mass or more.

In addition, among the entire food granules constituting the cat food in one or more embodiments, it is preferable that 40% or more of the food granules have a hardness of 1.3 kgw or less immediately after being immersed in the dilute hydrochloric acid (pH of 2.5) at 25° C. for 10 minutes. The lower limit of the hardness is 0.0 kgw (measuring precision or less).

In this way, in a case where 40% or more of the food granules which are sufficiently softened in the dilute hydrochloric acid are contained, unevenness in water absorbing properties in the entire pet food is easily reduced. Further, by increasing a percentage of the food granules which become softer, the digestibility improvement effect in the stomach after eating is further improved.

In the cat food, the food granules having the hardness of 1.3 kgw or less are preferably 40% by mass or more, more preferably 50% by mass or more, more preferably 60% by mass or more, and still more preferably 70% by mass or more.

The cat food according to one or more embodiments has a pepsin digestibility immediately after being immersed in a 500 U/mL pepsin hydrochloric acid solution at 38° C. for 4 hours of 60% or more. In the present disclosure, the expression "immediately after being immersed" indicates 1 minute after the cat food is taken out from the pepsin hydrochloric acid solution.

In one or more embodiments, 1 unit (U) of pepsin refers to amount that produces change amount 0.001 per minute of absorbance (A280) at a wavelength of 280 nm measured hemoglobin as a trichloroacetic acid solution at pH 2.0 and 37° C. and as a substrate (final volume=16 mL, optical path length=1 cm).

As the pepsin hydrochloric acid solution, for example, a solution prepared by dissolving 2 g of pepsin 250 U/mg in 1 L of hydrochloric acid (1+150) and adjusting to 500 U/mL can be used. The pH of the pepsin hydrochloric acid solution is preferably about 1.0.

The pepsin is not particularly limited, and commercially available products can be used. For example, sigma aldrich P-7000 or the like may be mentioned.

The pepsin digestibility of the cat food immersed in 500 U/mL pepsin hydrochloric acid solution at 38° C. for 4 hours is considered to correspond to the digestibility of half-life transferred from the stomach to the intestine. In a case where the pepsin digestibility is 60% or more, it is easily digested in the stomach after eating, and the digestibility after moving to the intestine is also improved.

In the cat food according to one or more embodiments, the pepsin digestibility immediately after being immersed in a 500 U/mL pepsin hydrochloric acid solution at 38° C. for 4 hours is preferably 65% or more, more preferably 70% or more, and still more preferably 75% or more.

The cat food according to one or more embodiments preferably has a high pepsin digestibility immediately after being immersed in the 500 U/mL pepsin hydrochloric acid solution at 38° C. for 4 hours or less, from the viewpoint of further improving the digestibility in the stomach after eating.

Specifically, in the cat food according to one or more embodiments, the pepsin digestibility immediately after being immersed in the 500 U/mL pepsin hydrochloric acid solution at 38° C. for 15 minutes is preferably 10% or more, more preferably 15% or more, still more preferably 20% or more, and particularly more preferably 25% or more.

In addition, in the cat food according to one or more embodiments, the pepsin digestibility immediately after being immersed in the 500 U/mL pepsin hydrochloric acid solution at 38° C. for 30 minutes is preferably 10% or more, more preferably 15% or more, still more preferably 20% or more and particularly more preferably 25% or more.

In addition, in the cat food according to one or more embodiments, the pepsin digestibility immediately after being immersed in the 500 U/mL pepsin hydrochloric acid solution at 38° C. for 1 hour is preferably 25% or more, more preferably 30% or more, still more preferably 35% or more, and particularly more preferably 40% or more.

Additionally, in the cat food according to one or more embodiments, the pepsin digestibility immediately after being immersed in the 500 U/mL pepsin hydrochloric acid solution at 38° C. for 2 hours is preferably 35% or more, more preferably 40% or more, still more preferably 45% or more, and particularly more preferably 50% or more.

The cat food according to one or more embodiments preferably has a high pepsin digestibility immediately after being immersed in the 500 U/mL pepsin hydrochloric acid solution at 38° C. for 8 hours or more, from the viewpoint of further improving a final digestibility. That is, the pepsin digestibility of the cat food immersed in 500 U/mL pepsin hydrochloric acid solution for 8 hours or more shows a digestibility in a state where an enzyme has almost or completely acted in the stomach.

Specifically, in the cat food according to one or more embodiments, the pepsin digestibility immediately after being immersed in the 500 U/mL pepsin hydrochloric acid solution at 38° C. for 8 hours is preferably 65% or more, more preferably 70% or more, still more preferably 75% or more, and particularly more preferably 80% or more.

Additionally, in the cat food according to one or more embodiments, the pepsin digestibility immediately after being immersed in the 500 U/mL pepsin hydrochloric acid solution at 38° C. for 16 hours is preferably 70% or more, more preferably 75% or more, still more preferably 80% or more, and particularly more preferably 85% or more.

[Raw Material]

The cat food according to one or more embodiments may satisfy the above-described physical property, but the raw material is not limited. Known raw materials can be used for manufacturing the cat food.

As examples of powder raw materials, cereals (corn, wheat, rice, barley, oats, and the like), beans (defatted soybeans, whole soybeans, and the like), starches (wheat starch, corn starch, rice starch, potato starch, tapioca starch, sweet potato starch, sago starch, and the like), vegetable protein (corn gluten meal, soy protein, and the like), meat (chicken, beef, pork, venison, and the like), meal (chicken meal, pork meal, beef meal, mixed meal of these, and the like), fish and shellfish (fish meat, meal (fish meal), and the like), vegetables, and powdery additives (vitamins, minerals, amino acids, flavor raw materials, fibers, coloring agents, palatability agents, and the like) are included.

The meals indicate powders obtained by compressing and finely grinding meat or fish and shellfish.

As examples of the palatability agent, animal raw material extracts, plant raw material extracts, yeast extracts (beer yeast extract, baker's yeast extract, torula yeast extract), and dried products of yeast (beer yeast, baker yeast, torula yeast, and the like) and the like are included.

As a liquid raw material to be added to the powder raw materials, a liquid raw material such as water, fats and oils, liquid sugar, solution of palatability agents, fragrance, and coloring agent can be used as necessary. In addition, after drying the puffed granules, the liquid raw material (coating agent) containing fats and oils, seasonings, palatability agents, fragrance and the like may be coated.

The fats and oils may be vegetable fats and oils, or animal fats and oils (chicken oil, pork fat (lard), beef tallow (head), milk fat, and the like). The coating agent preferably contains animal fats and oils, and particularly preferably contains beef tallow.

The mixture of raw materials is not particularly limited. It is preferable that the composition thereof is set such that the nutritional composition of the food granules to be obtained is satisfied and excellent formability is obtained.

55% to 75% by mass of cereals, 10% to 25% by mass of meats, 5% to 15% by mass of fish and shellfish, 2% to 5% by mass of vitamins and minerals, 2% to 20% by mass of fats and oils, the rest are other components, 100% by mass in total.

In addition, a fiber source (lignocellulose, refined cellulose, and the like) and a moisturizer (glycerin, sorbitol, and the like) may be contained in the cat food as a water absorbent contributing to water absorption of the food granules. The water absorbent may be used alone or in a combination of two or more kinds thereof.

In a case where the water absorbent is contained even for either cats or dogs, it is preferable that the amount of the water absorbent added is 0.5 to 15 parts by mass with respect to a total of 100 parts by mass of cereals, meats, fish and shellfish, and vitamins and minerals.

From the viewpoint of palatability, it is preferable that the content of the fiber source is small. The fiber source with respect to a total of 100 parts by mass of cereals, meats, fish and shellfish, and vitamins and minerals is preferably 0 to 9 parts by mass, and more preferably 0 to 3 parts by mass.

In particular, in a case where lignocellulose is contained as a fiber source, the amount thereof in the cat food is more than 0 and less than 6% by mass, preferably 3% by mass or less, and more preferably 1% by mass or less.

[Shape and Size]

A shape of the food granules constituting the cat food according to one or more embodiments may be any shape suitable for pets to eat, and is not particularly limited.

For example, any shape such as a sphere, a polygon, a column, a donut, a plate, a stone, a clover, and the like can be applied.

In addition, a size of the food granules may be a small particle shape in which the pets can bite at one bite, or a large particle shape in which the pet can bite multiple times.

For example, granules having a pellet shape (granule shape or lump shape) of which a minor and major axis are 3 to 25 mm, and a thickness from a lower surface (lower end) to a upper surface (upper end) of the food granules on the horizontal table is 2.5 to 20 mm in a case where the food granules placed on a horizontal table is viewed from above is preferable, a pellet shape of which the minor and major axis are 3 to 11 mm, and the thickness is 2.5 to 9 mm is more preferable, and a pellet shape of which the minor and major axis are 5 to 9 mm, and the thickness is 2.5 to 8 mm is still more preferable. In a case where the shape of the food granules is this shape, it is easy to adjust the hardness at the time of adjusting to a predetermined moisture content to a preferable range in a heat treatment and a drying treatment in a manufacturing step of the cat food <Manufacturing Method of Cat Food>

The manufacturing method of the cat food according to one or more embodiments may be a method that can manufacture food granules satisfying the above-described physical property, but the method is not particularly limited.

The puffed granules can be suitably manufactured using an extruder (extrusion molding machine).

Hereinafter, embodiments of the cat food of the present invention will be described in further detail.

The cat food according to one or more embodiments of a pet food granule body includes 60% or more of granules having a surface of which an arithmetic mean surface roughness Sa as measured using an L filter of a nesting index 0.25 mm is 14 μm or more. In the food granules constituting the pet food granule body, the surface roughness thereof may not be uniform over the entire surface, and Sa may be 14 μm or more in at least a part of the surface (measurement region of Sa).

In a case where the surface has Sa of 14 μm or more, the water absorbing properties of the food granules is improved, and the food granules are likely to be softened by absorbing a gastric juice and the like in the pet's body. It is probably because the larger the surface roughness of the food granules is, the larger a surface area of the food granules is and the easier it is to absorb water. Since the water absorbing properties of the pet food granule body is sufficiently improved and digestive juices easily permeate the granules by containing 60% or more of the food granules having the large surface roughness, the digestibility improvement effect in the stomach after eating is sufficiently obtained.

The food granules having the surface of which Sa is 14 μm or more with respect to the pet food granule body are preferably 65% by mass or more, and more preferably 70% by mass or more.

Although the upper limit of Sa is not specifically limited, in a case where the food granules are coated with fats and oils, these are difficult to coat uniformly in a case where Sa is too large. For example, Sa is preferably 30 μm or less, and more preferably 25 μm or less.

In one or more embodiments, the puffed granules can be suitably manufactured by using an extruder (extrusion forming machine). For example, a method of manufacturing the pet food granule body using the following manufacturing apparatus is preferable.

[Manufacturing Apparatus]

Figure 1:
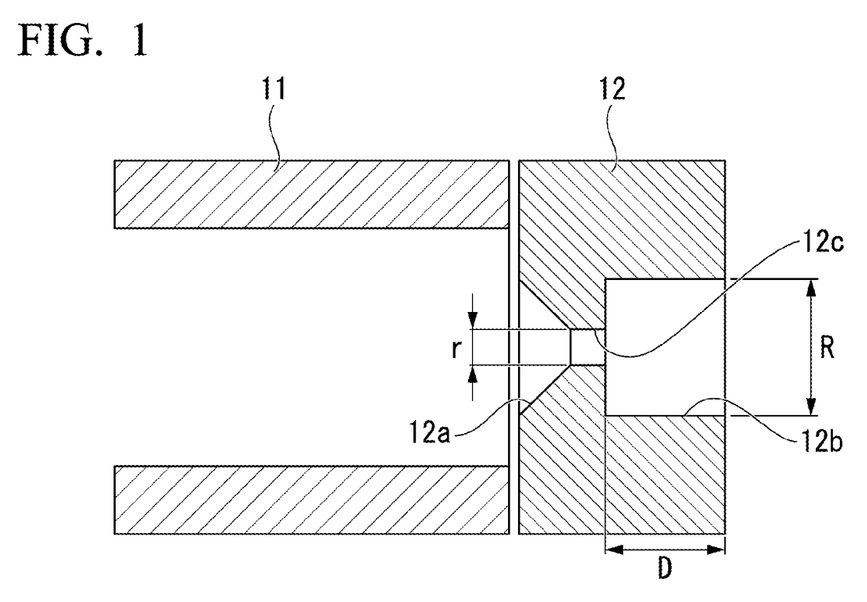
FIG. 1 is a cross-sectional view showing an example of a manufacturing apparatus of a pet food granule body according to one or more embodiments of the present invention.
Figure 2:
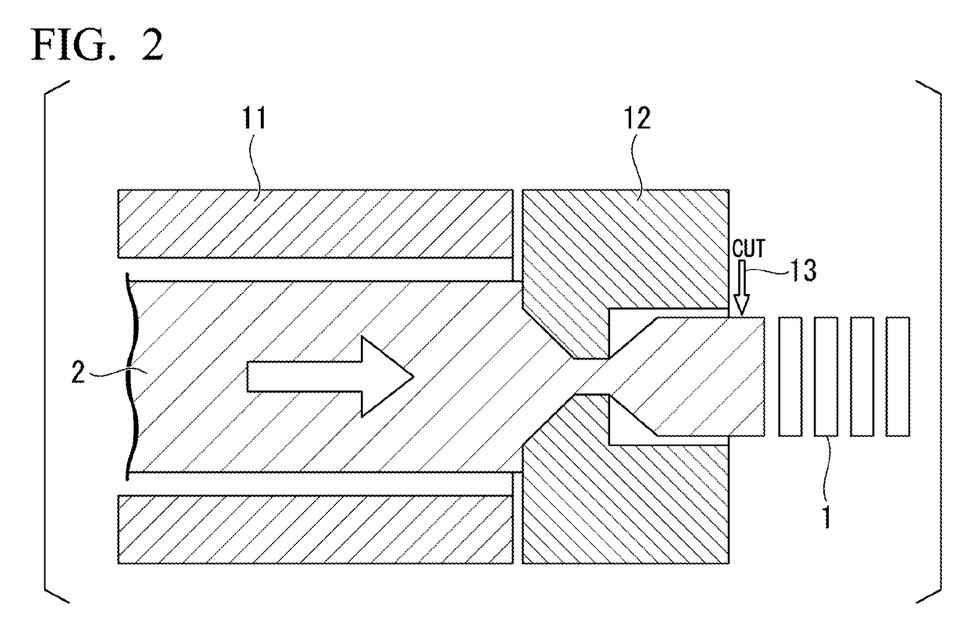
FIG. 2 is a cross-sectional view for explaining a method of manufacturing a pet food granule body using an apparatus of FIG. 1.

FIGS. 1 and 2 show an example of an apparatus suitable for manufacturing the pet food granule body in one or more embodiments, and are cross-sectional views schematically showing a main part. FIG. 2 is a cross-sectional view for explaining a method of manufacturing the pet food granule body using the apparatus shown in FIG. 1.

A reference sign 1 in FIGS. 1 and 2 shows food granules, a reference sign 2 shows a kneaded mixture, a reference sign 11 shows an extruder. An extruder 11 heats and kneads the mixture of raw materials to discharge a kneaded mixture 2. A die plate 12 for discharging the kneaded mixture 2 in a cylindrical shape is provided at a discharge opening of the extruder 11.

Although not shown, a cutter for cutting the kneaded mixture 2 in a predetermined length is provided in the vicinity of the discharge opening of the die plate 12. A reference sign 13 in FIG. 2 shows a cutting position by a cutter. For example, a rotary blade is used as a cutter.

The die plate 12 includes a first opening part 12a formed on the extruder 11 side, and a second opening part 12b provided on the cutter side. In a flow path connecting the first opening part 12a and the second opening part 12b, the first opening part 12a has a diameter gradually decreasing in a direction toward the second opening part 12b, and is connected to the second opening part 12b via a minimum inner diameter part 12c.

The inner diameter of the second opening part 12b is constant. A minimum inner diameter of the flow path is indicated by r, and an inner diameter of the second opening part 12b is indicated by R.

As shown in FIG. 2, the kneaded mixture 2 under high heat and pressure in the extruder 11 passes from the first opening part 12a of the die plate 12 through the flow path in the die plate 12 and from the minimum inner diameter part 12c, and it is extruded under normal pressure from the minimum inner diameter part 12c and expands in the second opening part 12b. In addition, it is sufficiently expanded while advancing toward an outlet (discharge opening of the die plate 12) of the second opening part 12b, and then is discharged from the discharge opening of the die plate 12 after beginning to be constricted in the second opening part 12b, and is cut by the cutter (cutting position 13). Thereby, a food granule 1 is formed (granulated).

As the kneaded mixture 2 expands, air bubbles are formed inside, and a cut surface has pores formed by cutting the air bubbles because of being cut by the cutter after the expansion is completely completed and the kneaded mixture 2 begins to be constricted.

A shape of the food granule 1 formed in this way is a column shape obtained by cutting the kneaded mixture 2 having a cylindrical shape at a surface perpendicular to a length direction. The cutting surface perpendicular to the length direction (upper and lower surfaces perpendicular to a thickness direction of the column shape) has a larger arithmetic mean surface roughness Sa than a side surface parallel to the length direction.

For example, in a case where the food granule 1 is viewed from a direction perpendicular to the length direction is preferable, it is preferable that a minor and major axis are 3 to 25 mm, and a thickness from a lower surface (lower end in thickness direction) to an upper surface (upper in thickness direction) of the food granules on the horizontal table is 2.5 to 20 mm, it is more preferable that the minor and major axis are 3 to 11 mm, and the thickness is 2.5 to 9 mm, and it is still more preferable that the minor and major axis is 5 to 9 mm, and the thickness is 2.5 to 8 mm.

In the die plate 12, the inner diameter R of the second opening part 12b is 3.5 times or more (R/r≥3.5) or more of the minimum inner diameter r of the flow path in the die plate 12. An upper limit of R/r representing a ratio of the inner diameter is preferably 4 or less, more preferably 3.6 or less from the viewpoint of formability of the food granules.

In a case where the ratio of R/r is 3.5 or more, since the kneaded mixture 2 can be sufficiently expanded, the air bubbles formed inside the kneaded mixture become large, and the pores formed in the cutting surface become large. That is, since the surface roughness of the cutting surface of the food granule 1 becomes large, the food granules having the surface of which Sa is 14 μm or more are obtained.

A size of the minimum inner diameter r is designed according to the size of the food granules to be obtained.

A shape of an outlet of the minimum inner diameter part 12c is designed according to the shape of the food granules to be obtained.

A distance D from when the kneaded mixture 2 leaves the minimum inner diameter part 12c to when it leaves the second opening part 12b is a length needed to start constricting after the kneaded mixture 2 advancing in the second opening part 12b is sufficiently expanded.

For example, the minimum inner diameter r of the flow path is preferably 3 to 10 mm, the inside diameter R of the second opening part 12b is preferably 9 to 40 mm, and the distance D is preferably 10 to 20 mm. More preferably, r is 4 to 6 mm, R is 12 to 24 mm, and D is 15 to 18 mm.

[Manufacturing Method of Pet Food Granule Body]

A method according to one or more embodiments for manufacturing the pet food granule body using the apparatus shown in FIGS. 1 and 2 will be described.

In advance, it is preferable that powder materials and liquid materials are mixed using a preconditioner, and heat treatment (pre-cooking) is performed at about 90° C. to 100° C. by adding warm water and steam to obtain mixture of raw materials. The content of water in the raw material mixture is preferably 10% to 25% by mass.

Next, the mixture of raw materials obtained by pre-cooking is supplied to the extruder 11 of the above apparatus. In the extruder 11, the mixture of raw materials is subjected to heat treatment at about 120° C. to 135° C. while being kneaded, and the kneaded mixture is discharged from the die plate 12 and cut to form the food granules. The kneaded mixture discharged from the extruder 11 is sufficiently expanded in the die plate 12 and then discharged and cut from the die plate 12 after beginning to be constricted.

After that, the drying treatment is performed to adjust the moisture content to a desired value, and obtain a desired pet food granule body. The mixture of raw materials may be coated after the drying treatment.

[Drying Treatment]

A method for the drying treatment of the food granules is not particularly limited, and known methods such as a method of drying naturally, a method of drying by blowing warm air, a method of drying under decompression, and a method of drying by freeze drying can be applied. Among these drying methods, the method of drying by blowing warm air is preferable in terms of improving the flavor of pet foods.

A temperature of the food granules and a temperature of the hot air blown onto the food granules during the drying treatment are not particularly limited. For example, the temperature of the warm air is preferably 150° C. or less, more preferably 90° C. to 120° C., and still more preferably 100° C. to 110° C. In a case of drying at this temperature, the heat treatment time is preferably 1 minute to 120 minutes, more preferably 5 minutes to 60 minutes, and still more preferably 5 minutes to 15 minutes. A lower limit of the temperature of the warm air is not particularly limited, and is usually a temperature exceeding a room temperature (20° C.), and preferably 30° C. or more.

In a case where it is at least the lower limit of the above temperature range and time range, the food granules can be dried in a relatively short time. In a case where it is below the upper limit of the above temperature range, it is possible to prevent the food granules from being excessively heated.

After drying, it may be further coated with a coating agent containing crude beef tallow, a seasoning or a flavoring agent.

The coating method is not particularly limited, and the pet food can be coated according to a vacuum coating method. The vacuum coating method is a method of reducing the pressure in a state in which the heated food granules and the coating agent are in contact with each other or adhere to each other and slowly releasing the food granules to the atmosphere. The coating agent may be in a liquid or powder state. By coating the food granules with the coating agent, the palatability (biting property) for a pet can be improved.

<Pet Food>

The pet food granule body according to one or more embodiments can be provided as it is as pet foods.

Alternatively, a mixture containing the pet food granule body according to one or more embodiments and other pet food granule bodies different therefrom may be provided as pet foods. Other pet food granule bodies will be described later.

Furthermore, the pet food may contain other small pieces (dried vegetable pieces, dried meat pieces, dried fish pieces, and the like) that are not granule shape (granule).

The pet food is provided, for example, in a product form in which a suitable amount is contained in a container.

[Other Pet Food Granule Bodies]

Other pet food granule bodies have a moisture content of 3% to 12% by mass, consists of granules containing a fiber source, and a percentage of granules having a surface of which the arithmetic mean surface roughness Sa (using an L filter with a nesting index of 0.25 mm) is 14 μm or more is less than 60%, and 60% or more of granules of which the hardness immediately after being immersed in the dilute hydrochloric acid (pH of 2.5) at 25° C. for 10 minutes is 2.5 kgw or less is contained.

The moisture content of the other pet food granule bodies and the hardness after being immersed in the diluted hydrochloric acid are the same as those of the pet food granule body according to one or more embodiments, including the preferable range.

It is preferable that the moisture content of the pet food granule body according to one or more embodiments coexisting in the pet foods and the moisture content of the other bodies are approximately the same. Specifically, an absolute value of a difference of the moisture content between thereof is preferably 0% to 5% by mass, and more preferably 0% to 3% by mass.

The other pet food granule bodies are different from the pet food granule body of one or more embodiments of the present invention in that the percentage of particles having the surface of which an arithmetic mean surface roughness Sa is 14 μm or more is less than 60%. The other pet food granule bodies have a reduced hardness after being immersed in the dilute hydrochloric acid by containing a fiber source.

As the fiber source, those exemplified as the water absorbent is preferable, and it may be one type individual and may use two or more types together. Among them, one or both of lignocellulose and refined cellulose are preferable in terms of palatability.

A content of the fiber source in the other pet food granule bodies is set so that the hardness after being immersed in the dilute hydrochloric acid falls within a predetermined range. For example, the fiber source is preferably 4% to 10% by mass, and more preferably 6% to 8% by mass with respect to other pet food granule bodies.

Examples of raw materials and mixtures of other pet food granule bodies are the same as those of the pet food granule body of one or more embodiments of the present invention except that a fiber source is contained as an essential component.

Examples of the shape and size of other pet food granule bodies are also the same as those of the pet food granule body of one or more embodiments of the present invention.

The pet food granule body may be puffed granules or non-puffed granules, and but puffed granules are preferable in that the hardness after being immersed in the dilute hydrochloric acid is easily reduced.

The manufacturing method of other pet food granule body may be a method that can manufacture food granules satisfying the above-described physical property, but the method is not particularly limited.

In a case where the other pet food granule bodies are puffed granules, they can be suitably manufactured by using an extruder (extrusion forming machine). For example, a method using the manufacturing apparatus shown in FIG. 3 is preferable.

Figure 3:
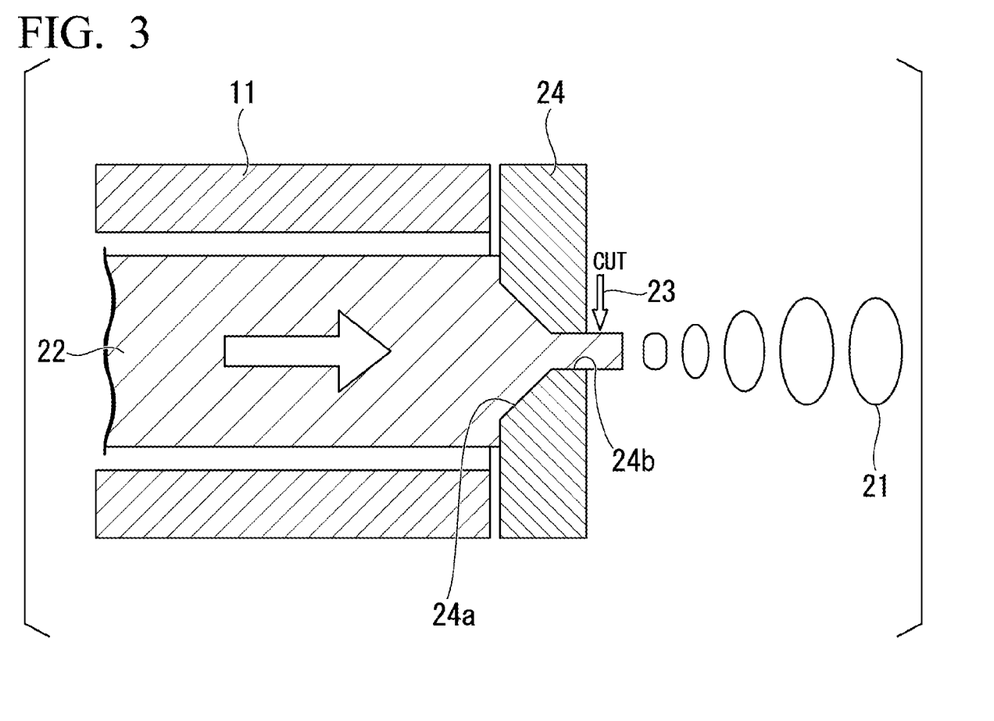
FIG. 3 is a cross-sectional view for explaining an apparatus and a method for manufacturing another pet food granule body according to one or more embodiments.

In FIG. 3, a reference sign 21 in FIGS shows food granules constituting other pet food granule bodies, a reference sign 22 shows a kneaded mixture, a reference sign 11 shows an extruder, and a reference sign 24 shows a die plate provided at the discharge opening of the extruder.

The apparatus shown in FIG. 3 differs greatly from the apparatus shown in FIG. 2 in that, in the die plate 24 provided at the discharge opening of the extruder 11, the opening part (discharge opening of the die plate 24) on the cutter side is an outlet of a minimum inner diameter part 24b, and the second opening part 12b in FIGS. 1 and 2 is not provided.

Although not shown, a cutter for cutting the kneaded mixture 22 in a predetermined length is provided in the vicinity of the outlet of the minimum inner diameter part 24b. A reference sign 23 in FIG. 3 shows a cutting position by a cutter.

For example, a rotary blade is used as a cutter.

Until the mixture of raw materials can be supplied to the extruder 11, it can be performed in the same method as the manufacturing method using the apparatus shown in FIGS. 1 and 2.

In the manufacturing method using the apparatus shown in FIG. 3, the kneaded mixture 22 which is under high temperature and high pressure in the extruder 11 is extruded under normal pressure from the minimum inner diameter part 24b in the die plate 24, and cut immediately thereafter by a cutter (cutting position 23). Thereby, the food granule 21 is formed. The food granule 21 is expanded after being cut and becomes rounded puffed granules. After that, the drying treatment is performed to adjust the moisture content to a desired value, and obtain a desired other pet food granule bodies. The food granule 21 may be coated after the drying treatment.

In a case where the food granule 21 is expanded after being cut, since a wall of air bubbles is likely to be broken in the vicinity of the surface, large air bubbles are difficult to form, and pores derived from the small air bubbles are formed on the surface. Further, since the food granule 21 is constricted after being expanded, the pores formed on the surface also constrict and become fine holes. For this reason, the arithmetic mean surface roughness Sa of the surface of food granules 21 becomes small.

In the pet foods including the pet food granule body according to one or more embodiments and the other pet food granule bodies, a mass ratio of the pet food granule body/the other pet food granule bodies according to one or more embodiments is 100/0 to 5/95 is preferable, 75/25 to 5/95 is more preferable, and 50/50 to 5/95 is further more preferable.

With respect to the entire pet food, a total amount of the pet food granule body and the other pet food granule bodies according to one or more embodiments is preferably 95% to 100% by mass, more preferably 98% to 100% by mass, and further more preferably 100% by mass.

According to the pet food granule body according to one or more embodiments, the decrease in the hardness according to water absorption can be increased by increasing the arithmetic mean surface roughness Sa of the puffed granules. As a result, the digestibility in the stomach after eating can be improved. Therefore, the digestibility in the stomach after eating can be improved without changing mixtures of the pet food granule body. That is, the digestibility in the stomach after eating can be improved without reducing the palatability.

Further, the pet food granule body according to one or more embodiments can improve the digestibility in the stomach after eating even in a case where the fiber source is not contained or the content of the fiber source is small. Therefore, the pet food granule body according to one or more embodiments is superior in palatability to other pet food granule bodies containing a fiber source.

The cat food according to one or more embodiments contains 0.5% to 15% by weight of a high water-absorbing resin.

The cat food according to one or more embodiments preferably contains 2% to 15% by weight, more preferably 4.0% to 10.0% by weight, and further more preferably 6.0% to 8.0% by weight of the high water-absorbing resin.

In a case where the content of the high water-absorbing resin is at least the lower limit of the above range, a digestive juice easily permeates the granules, and the eaten cat food promotes the absorption of digestive juice or water in the stomach, and the cat food becomes soft. Thus, it is possible to reduce the physical stimulus to a stomach wall or intestinal wall and to improve the digestibility in the stomach after eating. Moreover, in a case where the content of the high water-absorbing resin is the upper limit or less of the above range, indigestion can be prevented.

As the high water-absorbing resin, lignocellulose or refined cellulose having an average grain size of 50 μm or more is preferable.

(Lignocellulose)

In one or more embodiments, lignocellulose is made of woods or the like as a raw material, and is composed of cellulose, hemicellulose, and lignin. The content of cellulose in the lignocellulose is preferably 50% to 80% by weight, and the content of lignin is preferably 20% to 30% by weight.

(Refined Cellulose)

In one or more embodiments, refined cellulose means cellulose having a lignin content of less than 1%. In the cat food according to one or more embodiments, the lignin content in the refined cellulose is preferably 0.8% or less, more preferably 0.5% or less, and further more preferably 0.3% or less.

In one or more embodiments, the average grain size of the refined cellulose is preferably 50 μm or more, more preferably 55 µm or more, and further more preferably 60 µm or more. In a case where the pet food contains refined cellulose having an average grain size of 50 µm or more, water absorbing properties of the food granules of dry food are improved. As a result, the fibers in the food granules absorb the gastric juice so that the food granules soften after a cat has eaten the food granules, and thus digestibility in the stomach can be improved.

In one or more embodiments, among refined cellulose, it is preferable that the percentage of refined cellulose having a grain size of 100 µm or greater is 20% or greater, the percentage of refined cellulose having a grain size of 200 µm or greater is 5% or greater, and the percentage of refined cellulose having a grain size of 300 µm or greater is 2% or greater. It is more preferable that the percentage of refined cellulose having a grain size of 100 µm or more is 25% or more, the percentage of refined cellulose having a grain size of 200 µm or more is 8% or more, and the percentage of refined cellulose having a grain size of 300 µm or more is 3% or more. It is still more preferable that the percentage of refined cellulose having a grain size of 100 µm or more is 30% or more, the percentage of refined cellulose having a grain size of 200 µm or more is 10% or more, and the percentage of refined cellulose having a grain size of 300 µm or more is 5% or more. In a case where the refined cellulose contains an appropriate amount of fibers with a large grain size, the effect of water absorption is improved, and digestibility in the stomach can be improved.

[Method of Measuring Average Grain Size of Refined Cellulose and Percentage of Fibers]

In the present disclosure, the average grain size of refined cellulose is a value obtained according to the following measuring method.

0.5 g of refined cellulose used for measurement is collected in a 100 ml beaker, 60 ml of 0.5% hexametaphosphoric acid solution is added to the beaker, and the solution is treated under conditions of an output of 100% for 2 hours using an ultrasonic treatment device (manufactured by Hielscher Ultrasonic GmbH), thereby obtaining a measurement sample.

The obtained sample is analyzed by a laser diffraction type grain size distribution measuring device (product name: MASTERSIZER 2000, manufactured by Spectris Co., Ltd.), the grain size distribution is expressed as accumulation distribution, and the value at which the accumulation distribution becomes 50% is set as the average grain size. Further, the percentage of refined cellulose (fibers) having a grain size of 100 µm or more, the percentage of refined cellulose (fibers) having a grain size of 200 µm or more, and the percentage of refined cellulose (fibers) having a grain size of 300 µm or more are respectively calculated based on the total accumulation distribution.

[Manufacturing Method of Refined Cellulose]

The refined cellulose can be manufactured by performing a raw material pulp slurry preparing step, an acid hydrolysis reaction step, a neutralizing, washing, and dehydrating step, a drying step, a pulverizing step, and a classifying step described below.

[Raw Material Pulp Slurry Preparing Step]

A pulp used as a raw material of refined cellulose is not particularly limited, and both of pulp derived from a broad-leaved tree and pulp derived from a coniferous tree can be used.

Examples of the broad-leaved tree include acer, birch, fagus crenata, acacia, and eucalyptus. Among these, fagus crenata, acacia, or eucalyptus is preferable.

Examples of the coniferous tree include *Cryptomeria japonica*, *Picea jezoensis*, *Larix kaempferi*, *Pinus thumbergii*, *Abies sachalinensis*, *Pinus parviflora*, *Texus cuspidata*, *Thuja standishii*, *Picea torano*, *Picea alcokiana*, *Podocarpus macrophyllus*, *Abies firma*, *Scomberomorus niphonius*, *Pseudotsuga japonica*, *Thujopsis dolabrata*, *Thujopsis*, *Tsuga sieboldii*, *Tsuga diversifolia*, *Chamaecyparis obtusa*, *Taxus cuspidata*, *Cephalotaxus harringtonia*, *Picea*, *Chamaecryparis lawsonia*, *Pseudotsuga menziesii*, *Picea sitchensis*, *Pinus radiata*, Eastern red spruce, *Pinus strobus*, and tree species related to these. Among these, *Cryptomeria japonica*, *Picea jezoensis*, *Larix kaempferi*, *Pinus thumbergii*, *Abies sachalinensis*, *Chamaecyparis obtusa*, *Pinus densiflora*, *Pseudotsuga menziesii*, or *Pinus radiata* is preferable, and *Picea jezoensis*, *Larix kaempferi*, *Pinus densiflora*, or *Pseudotsuga menziesii* is more preferable.

The pulp may be used alone or in a combination of optional two or more kinds thereof.

In one or more embodiments, it is preferable that the refined cellulose is derived from a coniferous tree. By using pulp derived from a coniferous tree as a raw material of the refined cellulose, refined cellulose having an average grain size of 50 µm or more is easily obtained.

A pulping method (digestion method) for a raw material is not particularly limited, and examples thereof include a sulfite digestion method, a kraft digestion method, a soda and quinone digestion method, and an organosolve digestion method.

The pulp raw material which can be used may be in a viscous flow state or in a sheet shape. In a case where viscous flow pulp from a pulp bleaching step is used as a raw material, the concentration thereof needs to be increased before the raw material is put into a hydrolysis reaction tank, the raw material is concentrated using a dehydrator such as a screw press or a belt filter, and a predetermined amount of raw material is put into the reaction tank. In a case where a dry sheet of pulp is used as a raw material, the pulp is ground using a crusher such as a roll crusher, and the ground pulp is put into the reaction tank.

[Acid Hydrolysis Reaction Step]

Next, the acid concentration is adjusted to be in a range of 0.1 N to 2.0 N and preferably in a range of 0.1 N to 1.5 N, and a dispersion liquid having a pulp concentration of 3 to 10% by weight (in terms of solid content) is treated under a temperature condition of 80° C. to 100° C. for 30 minutes to 3 hours. After the hydrolysis treatment performed on the pulp, the resultant is solid-liquid separated into waste acid and pulp which is hydrolyzed during a dehydrating step.

[Neutralizing, Washing, and Dehydrating Step]

The hydrolyzed pulp is neutralized by adding an alkali agent, washed and dehydrated.

The alkali agent is not particularly limited, and a known one can be used as the alkali agent.

The washing and dehydrating step can be performed according to a known method in the field of the pulp of the related art.

[Drying Step, Pulverizing Step, and Classifying Step]

Thereafter, food granules are dried using a dryer and mechanically pulverized and classified such that the food granules have a prescribed size using a pulverizer.

Examples of the pulverizer used in one or more embodiments of the present invention include cutting type mills such as a mesh mill (manufactured by HORAI CO., LTD.), ATOMS (manufactured by Yamamoto Hyakuma Seisakusho K. K.), a knife mill (manufactured by PALLMANN), a cutter mill (manufactured by TOKYO ATOMIZER M.F.G. CO., LTD.), a CS cutter (manufactured by Mitsui Mining Co., Ltd.), a rotary cutter mill (manufactured by NARA MACHINERY Co., Ltd.), a turbo cutter (manufactured by Freund Corp.), a pulp primary crusher (manufactured by ZUIKO CORPORATION), and a shredder (manufactured by Shinko Pantec Co., Ltd.); hammer type mills such as a jaw crusher (manufactured by Makino) and a hammer crusher (manufactured by MAKONO MFG. CO., LTD.); impact type mills such as a pulverizer (manufactured by Hosokawa Micron Corporation), a fine impact mill (manufactured by Hosokawa Micron Corporation), a super micron mill (manufactured by Hosokawa Micron Corporation), INNOMIZER (manufactured by Hosokawa Micron Corporation), a fine mill (manufactured by NIPPON PNEUMATIC MFG. CO., LTD.), CUM type centrifugal mills (manufactured by Mitsui Mining Co., Ltd.), an exceed mill (manufactured by MAKONO MFG. CO., LTD.), ULTRAPLEX (manufactured by MAKONO MFG. CO., LTD.), CONTRAPLEX (manufactured by MAKONO MFG. CO., LTD.), KOLLOPLEX (manufactured by MAKONO MFG. CO., LTD.), a sample mill (manufactured by Seishin Enterprise Co., Ltd.), BANTAM mill (manufactured by Seishin Enterprise Co., Ltd.), an atomizer (manufactured by Seishin Enterprise Co., Ltd.), a tornado mill (NIKKISO Co., Ltd.), NEA mill (manufactured by DALTON Corporation), an HT type fine pulverizer (manufactured by HORAI CO., LTD.), a free pulverizer (manufactured by NARA MACHINERY Co., Ltd.), NEW COSMOMIZER (manufactured by NARA MACHINERY Co., Ltd.), a turbo mill (manufactured by Freund Corp.), a gather mill (manufactured by Nishimura Machine Works Co., Ltd.), a super ultra mill (manufactured by Nishimura Machine Works Co., Ltd.), a blade mill (manufactured by Nisshin Engineering Inc.), a super rotor (manufactured by Nisshin Engineering Inc.), Npa crusher (manufactured by Sansho Industry Co., Ltd.), WILLEY pulverizer (manufactured by Sanki Seisakusho, K. K.), a pulp pulverizer (manufactured by ZUIKO CORPORATION), JACOBSON fine pulverizer (manufactured by Shinko Pantec Co., Ltd.), and a universal mill (manufactured by TOKUJU CORPORATION); jet type mills such as a CGS type jet mill (manufactured by Mitsui Mining Co., Ltd.), a micron jet (manufactured by Hosokawa Micron Corporation), a counter jet mill (manufactured by Hosokawa Micron Corporation), a cross jet mill (manufactured by Kurimoto, Ltd.), an ultrasonic jet mill (manufactured by Nippon Pneumatic Mfg. Co., Ltd.), a current jet (manufactured by Nisshin Engineering Inc.), a jet mill (manufactured by Sansho Industry Co., Ltd.), EBARA jet micronizer (manufactured by EBARA CORPORATION), EBARA TRIAD jet (manufactured by EBARA CORPORATION), CEREN Miller (manufactured by MASUKO SANGYO Co., Ltd.), NEW-MICROCYCLOMAT (manufactured by Masuno Seisakusho Ltd.), and CRYPTRON (manufactured by Kawasaki Heavy Industries, Ltd.). Among these, from the viewpoint of excellent fine pulverizability, it is preferable to use a tornado mill (NIKKISO Co., Ltd.), a blade mill (manufactured by Nisshin Engineering Inc.), or a free pulverizer (manufactured by NARA MACHINERY Co., Ltd.).

First, in a case where powder is manufactured by performing only mechanical pulverization without performing an acid treatment, it is preferable to use a vertical roller mill having excellent fine pulverizability. In one or more embodiments of the present invention, the vertical roller mill indicates a centrifugal vertical pulverizer belonging to roller mills and performs pulverization so as to grind ingredients with a discotic turntable and a vertical roller. The most distinctive feature of the vertical roller mill is excellent fine pulverizability, and the reason for this is that raw materials are pulverized using a force of compressing raw materials between the roller and the table and the shearing force generated between the roller and the table. Examples of the pulverizer which has been used in the related art include a vertical roller mill (manufactured by Scenion Inc.), a longitudinal roller mill (manufactured by Schaeffler Japan Co., Ltd.), a roller mill (manufactured by Kotobuki Engineering & Manufacturing Co., Ltd.), a VX mill (manufactured by Kurimoto, Ltd.), a KVM type vertical mill (manufactured by EARTHTECHNICA Co., Ltd.), and an IS mill (manufactured by IHI Plant Engineering Corporation). Even in the case where powder is manufactured by performing only mechanical pulverization, the size of the powder can be adjusted to a predetermined value through the classifying step.

<Manufacturing Method of Cat Food>

[Granulating Step]

In the granulating step, a mixture of raw materials is granulated to obtain the food granules. Known methods can be used as the method of mixing raw materials to obtain a mixture of the raw materials and the method of forming (granulating) the mixture of raw materials in a granule shape.

For example, a method of manufacturing puffed granules using an extruder can be suitably used.

As a method of manufacturing puffed granules using an extruder, for example, a method described in "Small Animal Clinical Nutrition 5th Edition" (edited by Michael S. Hand, Craig D. Thatcher, Rebecca L. Remillard, Philip Roudebusg, and Bruce J. Novotny, published by Mark Morris Associates; 2014; p 209 to p 215) or the like can be used.

An example of the method of manufacturing puffed granules using an extruder is as follows. First, in the raw materials of puffed granules, raw materials other than external additives are pulverized as necessary and mixed. The raw materials may be mixed while being pulverized using a grinder or the like. Further, water (which is not included in the raw material composition) is added thereto as necessary to obtain a mixture of the raw materials.

The obtained mixture of raw materials is put into the extruder, heated, pressed, and extruded from an outlet. The outlet is provided with a plate in which a hole having a predetermined shape is formed and a cutter cutting the mixture of raw materials extruded from the plate to have a predetermined length (thickness). At the same time with the extrusion of the mixture of raw materials from the hole in the plate and the formation of the mixture in a predetermined shape by cutting the mixture using a cutter, the mixture of raw materials are released to the atmospheric pressure from the pressurized state so that water vapor in the mixture of raw materials expands, and the mixture of raw materials is puffed, thereby obtaining porous granules.

[Drying Step]

The granules to be obtained in the above-described manner are dried as necessary until a predetermined moisture content is obtained to obtain puffed granules (food granules). In a case where dry type food granules are manufactured, the drying step is indispensable.

For example, the moisture content of granules to be discharged from the extruder is in a range of 10% to 20% by mass. In a case where the moisture content of the granules is in the above-described range, excellent formability is likely to be obtained. The temperature of granules to be discharged from the extruder depends on the heating temperature in the extruder. For example, the temperature thereof may be in a range of 90° C. to 150° C.

As the method of drying the granules discharged from the extruder, a known method can be appropriately used. Examples of the known method include a hot air drying method of drying granules by blowing hot air to the granules; a decompression drying method; and a method of frying granules in oil. For example, a hot air drying method using a conveyor type hot air dryer is preferable.

The drying conditions (the temperature and the time) may be conditions for increasing the temperature of granules to 100° C. or higher to evaporate the moisture in the granules without thermal denaturation of the components of the granules and adjusting the moisture content of the granules to a desired value.

For example, in a case where the granules are dried by a hot air dryer, the temperature of the hot air coming into contact with the granules is preferably in a range of 100° C. to 140° C. and more preferably in a range of 100° C. to 110° C. The drying time is particularly limited, and the granules are dried for approximately 5 to 20 minutes.

The pet food may be further coated with a coating agent containing crude beef tallow, a seasoning, or a flavoring agent after being dried.

The coating method is not particularly limited, and the pet food can be coated according to a vacuum coating method.

The vacuum coating method is a method of reducing the pressure in a state in which the heated food granules and the coating agent are in contact with each other or adhere to each other and slowly releasing the food granules to the atmosphere. The coating agent may be in a liquid or powder state. By coating the food granules with the coating agent, the palatability (biting property) for a pet can be improved.

The cat food according to one or more embodiments of the present invention can be sold on product packaging and the like indicating that it is a cat food with an improved digestibility in order to inform the pet owner of the fact that the digestibility in the stomach after eating is improved.

The cat food according to one or more embodiments of the present invention has a pepsin digestibility immediately after being immersed in a 500 U/mL pepsin hydrochloric acid solution at 38° C. for 4 hours of 60% or more. Therefore, the cat food of the present invention is easily digested in the stomach after eating. In particular, the digestibility after transferring to the intestine is improved since the digestibility after 4 hours of half-life for transfer from the stomach to the intestine is high.

EXAMPLES

Embodiments of the present invention will be described in more detail with reference to the following example, but the present invention is not limited to these examples.

Example 1

The pet food granule body was manufactured using the apparatus shown in FIGS. 1 and 2.

The minimum inner diameter r of the flow path in the die plate 12 was 5 mm, the inside diameter R of the second opening part was 18 mm, and the distance D was 18 mm The ratio of R/r is 3.6. The outlet of the minimum inner diameter part 12c and the outlet of the second opening part 12b are both circular.

First, using the preconditioner, the raw materials are mixed according to the mixture shown in Table 1, warm water and steam are added, and heat treatment is performed at 90° C. to 100° C. for 3 minutes by adding warm water and steam to obtain a raw material mixture (moisture content 20% to 26% by mass).

Next, the obtained raw material mixture is supplied to an extruder, subjected to heat treatment at 120° C. to 135° C. for 30 seconds while being kneaded, and the kneaded mixture is discharged from the die plate and cut to obtain the food granules in a column shape having a diameter of 8 mm and thickness 3.5 mm was formed.

Thereafter, the obtained food granules were dried by a dryer at about 90° C. to 110° C. for about 60 minutes to adjust the moisture content to 8% by mass.

After drying, the fats and oils for coating were coated at a coating amount of 5% by mass with respect to the entire pet food (including external additives) by a vacuum coating method to obtain the pet food granule body.

Example 2

First, using a preconditioner, the raw materials were mixed according to the mixture shown in Table 1, and was subjected to a heat treatment at 90° C. to 100° C. for 3 minutes. Thereafter it was granulated so as to obtain a mixture of circular food granules having a diameter of 5 to 15 mm and a thickness of 2 to 5 mm and quadrifoliate food granules having an inner diameter of 5 to 15 mm and an outer diameter of 2 to 5 mm (modification degree of 1.2 to 5) using an extruder. The mixture was subjected to a heat treatment in a temperature range of 120° C. to 135° C. for 30 seconds during the granulation through extrusion. Thereafter, the obtained food granules were dried in a temperature range of approximately 90° C. to 110° C. for approximately 60 minutes using a dryer.

Next, the dried food granules were coated with a coating agent containing crude beef tallow, a seasoning, and a flavoring agent such that the coating amount thereof was set to 5% by mass with respect to the entire pet food (including the external additives). Thereby the pet food was obtained.

Comparative Example 1

The pet food was obtained in the same manner as in example 2 except that the raw materials were changed to the mixtures shown in Table 1.

TABLE 1

| | | Example 1 | Example 2 | Comparative Example 1 |
|---|---|---|---|---|
| Mixture [% By Mass] | Cereal | 60.5 | 53.0 | 60.5 |
| | Meat | 21.2 | 21.2 | 21.2 |
| | Fish And Shellfish | 10.5 | 10.5 | 10.5 |
| | Yeast | 0.3 | 0.3 | 0.3 |
| | Vitamin, Mineral, Amino Acid | 5.0 | 2.5 | 5.0 |
| | Crude Beef Tallow | 5.0 | 5.0 | 5.0 |
| | Lignocellulose | — | 7.5 | — |

[Evaluation of Pepsin Digestibility (1)]

First, regarding the cat food of each example of examples 1 to 2 and comparative example 1, a value of crude protein content (crude protein content of food granules) was calculated using the Kjeldahl method.

Next, regarding the cat food of each example of examples 1 to 2 and comparative example 1, 1g as a sample was weighed into a 200 mL conical flask.

Next, 2 g of pepsin (sigma aldrich P-7000; 250 U/mg) was dissolved in 1 L of hydrochloric acid (1+150) to prepare 500

U/mL pepsin hydrochloric acid solution. The pepsin hydrochloric acid solution was added to the 200 mL conical flask containing a sample. The 200 mL conical flask to which pepsin hydrochloric acid solution was added was sealed and shaken at 38° C. for a predetermined time shown in Table 2.

Next, the contents in the 200 mL conical flask were filtered and a residue was washed with warm water. Thereafter, the residue on the filter paper was placed in a Kjeldahl decomposition bottle together with the filter paper, and decomposition, distillation, and titration were performed by the Kjeldahl method, and the crude protein content of the residue was calculated.

Using the crude protein content (sample CP) of the analysis sample measured in advance and the crude protein content (residue CP) of the residue, the pepsin digestibility was calculated from the following equation.

Pepsin digestibility (%)=[100-(residue *CP*-filter paper *CP*)]/sample *CP*×100

In addition, the pepsin digestibility was evaluated six times for each example of examples 1 and 2 and comparative example 1. The results are listed in Table 2. In Table 2, SD shows a standard deviation.

TABLE 2

Pepsin Digestibility (%) After Predetermined Time Had Elapsed

| Number Of Trials | 15 Minutes | 30 Minutes | 1 Hour | 2 Hours | 4 Hours | 8 Hours | 16 Hours |
|---|---|---|---|---|---|---|---|
| Example 1 | | | | | | | |
| 1 | 32.2 | 36.9 | 51.0 | 65.6 | 79.0 | 87.0 | 92.2 |
| 2 | 28.9 | 40.3 | 51.9 | 67.6 | 79.9 | 85.9 | 91.7 |
| 3 | 33.8 | 38.3 | 52.2 | 64.7 | 77.6 | 85.5 | 92.5 |
| 4 | 28.8 | 40.9 | 51.0 | 67.1 | 78.6 | 86.1 | 91.3 |
| 5 | 31.0 | 37.9 | 51.8 | 66.6 | 75.6 | 85.8 | 92.6 |
| 6 | 33.6 | 38.5 | 55.0 | 66.0 | 79.1 | 85.8 | 92.0 |
| Average ± SD | 31.4 ± 2.2 | 38.8 ± 1.5 | 52.2 ± 1.5 | 66.3 ± 1.0 | 78.3 ± 1.5 | 86.0 ± 0.5 | 92.1 ± 0.5 |
| Example 2 | | | | | | | |
| 1 | 18.6 | 24.6 | 36.6 | 55.3 | 68.8 | 81.1 | 88.7 |
| 2 | 15.2 | 26.5 | 38.5 | 53.0 | 67.0 | 82.7 | 89.5 |
| 3 | 20.9 | 23.3 | 38.8 | 52.1 | 67.5 | 81.0 | 88.6 |
| 4 | 14.1 | 25.9 | 36.2 | 54.6 | 68.6 | 80.1 | 91.0 |
| 5 | 14.9 | 24.4 | 37.8 | 54.1 | 70.0 | 81.5 | 88.1 |
| 6 | 19.6 | 25.2 | 40.6 | 55.2 | 70.0 | 79.8 | 88.8 |
| Average ± SD | 17.2 ± 2.8 | 25.0 ± 1.1 | 38.1 ± 1.6 | 54.1 ± 1.3 | 68.7 ± 1.3 | 81.0 ± 1.0 | 89.1 ± 1.0 |
| Comparative Example 1 | | | | | | | |
| 1 | 12.5 | 13.7 | 24.2 | 37.3 | 57.8 | 71.0 | 83.8 |
| 2 | 9.8 | 14.4 | 26.3 | 38.0 | 56.6 | 70.9 | 82.0 |
| 3 | 11.9 | 14.6 | 26.5 | 40.3 | 53.1 | 71.4 | 84.1 |
| 4 | 8.8 | 14.1 | 25.1 | 40.9 | 54.0 | 70.0 | 81.8 |
| 5 | 10.9 | 15.8 | 24.5 | 39.7 | 54.9 | 69.7 | 80.5 |
| 6 | 10.6 | 13.5 | 26.6 | 40.6 | 56.6 | 72.6 | 84.4 |
| Average ± SD | 10.7 ± 1.3 | 14.3 ± 0.8 | 25.5 ± 1.1 | 39.5 ± 1.5 | 55.5 ± 1.8 | 70.9 ± 1.0 | 82.8 ± 1.6 |

Figure 4:
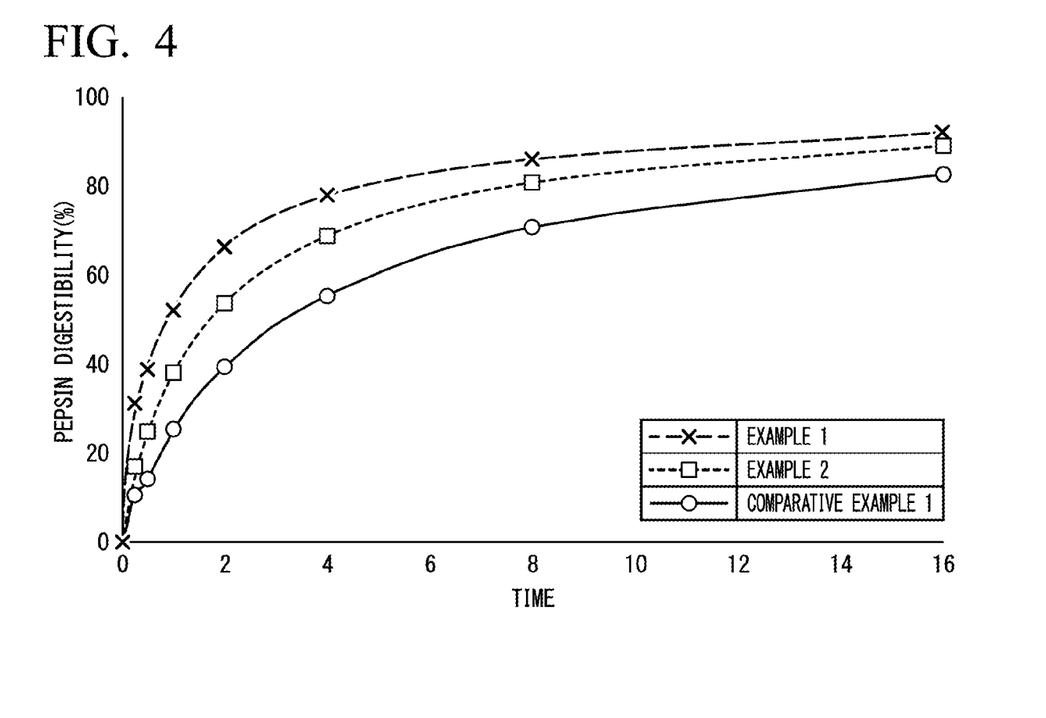
FIG. 4 is a graph showing a time-dependent change in a pepsin digestibility of a cat food of examples according to one or more embodiments and comparative examples.

FIG. 4 is a graph showing time-dependent changes in a pepsin digestibility of the samples of each example of examples 1 and 2 and comparative example 1.

From the results shown in Table 2 and FIG. 4, it was confirmed that the cat food of examples 1 and 2 has a pepsin digestibility immediately after being immersed in a 500 U/mL pepsin hydrochloric acid solution at 38° C. for 4 hours of 60% or more.

In particular, the sample of example 1 had a very high pepsin digestibility of 75% or more immediately after being immersed in 500 U/mL pepsin hydrochloric acid solution at 38° C. for 4 hours.

Further, in examples 1 and 2, it was confirmed that the pepsin digestibility was high, particularly in a short elapsed time of 4 hours or less, as compared with comparative example 1.

Comparative Examples 2 to 3

Two commercially available dry granular cat foods are referred to as Comparative Examples 2 to 3. In all cases, it was confirmed that the moisture content was in the range of 5% to 10% by mass.

In addition, the cat food of comparative example 2 provided comprehensive nutrition. Moreover, the cat food of comparative example 3 was a therapeutic food in which digestion was considered.

[Evaluation of Pepsin Digestibility (2)]

For the pet food of each example of comparative examples 2 to 3, the pepsin digestibility (%) after a predetermined time had elapsed was calculated in the same manner as the above-mentioned "evaluation of pepsin digestibility (1)" The results are shown in Table 3.

TABLE 3

Pepsin Digestibility (%) After Predetermined Time Had Elapsed

| Number Of Trials | 15 Minutes | 30 Minutes | 1 Hour | 2 Hours | 4 Hours | 8 Hours | 16 Hours |
|---|---|---|---|---|---|---|---|
| Comparative Example 2 | | | | | | | |
| 1 | 3.1 | 5.4 | 14.6 | 31.6 | 46.9 | 63.8 | 76.9 |
| 2 | 6.7 | 12.1 | 19.2 | 33.5 | 50.1 | 64.8 | 79.5 |
| 3 | 5.2 | 9.0 | 15.3 | 31.6 | 47.9 | 63.5 | 76.5 |
| 4 | 3.1 | 9.0 | 18.2 | 33.9 | 51.1 | 66.8 | 80.8 |
| 5 | 6.0 | 10.6 | 19.8 | 34.5 | 50.1 | 62.2 | 81.1 |
| 6 | 5.7 | 10.1 | 17.2 | 33.2 | 46.2 | 64.8 | 78.5 |
| Average ± SD | 5.0 ± 1.5 | 9.4 ± 2.3 | 17.4 ± 2.1 | 33.1 ± 1.2 | 48.7 ± 2.0 | 64.3 ± 1.6 | 78.9 ± 1.9 |
| Comparative Example 3 | | | | | | | |
| 1 | 11.6 | 16.6 | 27.2 | 43.4 | 55.4 | 71.8 | 81.7 |
| 2 | 11.6 | 18.7 | 28.8 | 44.0 | 55.4 | 70.5 | 79.0 |
| 3 | 12.6 | 19.0 | 28.6 | 44.5 | 58.0 | 72.4 | 82.7 |
| 4 | 17.1 | 20.6 | 30.9 | 46.3 | 59.9 | 72.6 | 83.0 |
| 5 | 11.0 | 16.9 | 28.6 | 43.7 | 58.0 | 71.6 | 79.3 |
| 6 | 15.0 | 19.0 | 31.5 | 46.1 | 58.6 | 73.2 | 83.5 |
| Average ± SD | 13.2 ± 2.4 | 18.5 ± 1.5 | 29.3 ± 1.6 | 44.7 ± 1.2 | 57.6 ± 1.8 | 72.0 ± 0.9 | 81.5 ± 1.9 |

Figure 5:
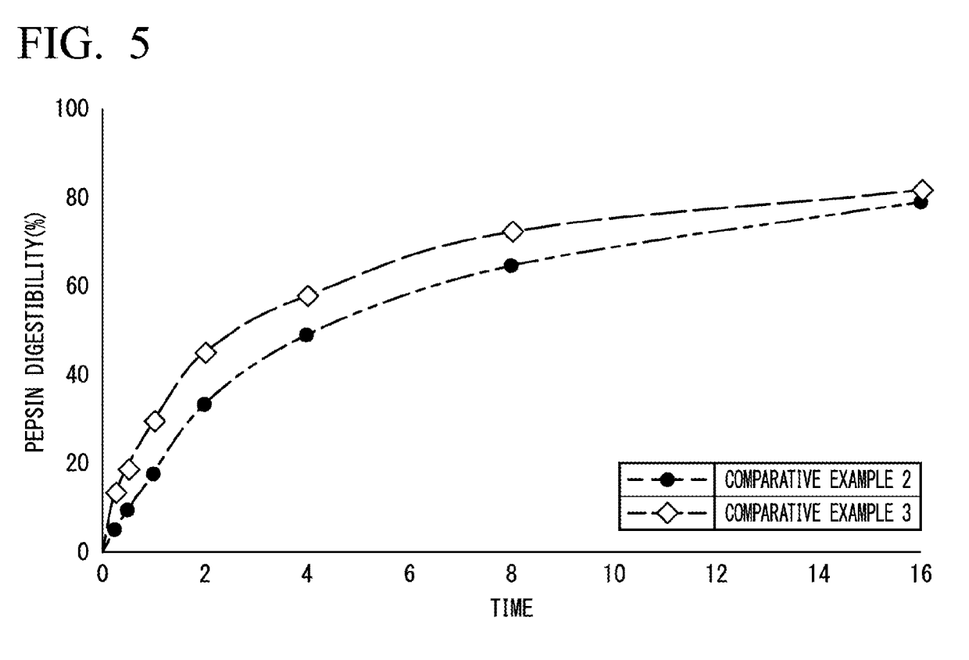
FIG. 5 is a graph showing a time-dependent change in a pepsin digestibility of a cat food of comparative examples.

FIG. 5 is a graph showing time-dependent changes in a pepsin digestibility of the samples of each example of comparative examples 2 and 3.

From the results shown in Table 3 and FIG. 5, it was confirmed that the pepsin digestibility in examples 1 and 2 was high, particularly in a short elapsed time of 4 hours or less, as compared with comparative examples 2 and 3.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. Cat food comprising:
    food granules comprising extruded puffed granules having a moisture content of 12% or less,
    wherein
    60% or more of the food granules have a hardness of 2.5 kgw or less 1 minute after being immersed in a dilute hydrochloric acid (pH of 2.5) at 25° C. for 10 minutes, 60% or more of the food granules have an arithmetic mean surface roughness Sa of 14 μm or more, as measured using an L filter of a nesting index 0.25 mm, and a pepsin digestibility of the food granules, 1 minute after being immersed in a 500 U/mL pepsin hydrochloric acid solution at 38° C. for 4 hours, is 60% or more.

2. The cat food according to claim 1, wherein the pepsin digestibility of the food granules, 1 minute after being immersed in the 500 U/mL pepsin hydrochloric acid solution at 38° C. for 16 hours, is 80% or more.

3. The cat food according to claim 1, wherein the cat food contains 0.5% to 15% by weight of high water-absorbing resin.

4. The cat food according to claim 3, wherein the high water-absorbing resin is lignocellulose.

5. The cat food according to claim 3, wherein the high water-absorbing resin is a refined cellulose having an average grain size of 50 μm or more.

6. The cat food according to claim 2, wherein the cat food contains 0.5% to 15% by weight of high water-absorbing resin.

7. The cat food according to claim 1, wherein the surface of which an arithmetic mean surface roughness Sa as measured using an L filter of a nesting index 0.25 mm is 14 μm or more is a cutting surface generated by cutting a mixture of raw materials which are extruded by the extruder, after a gas is generated inside the extruded mixture to expand the mixture and the expanded mixture begins to be constricted.

8. The cat food according to claim 1, wherein 65% or more of the food granules in the entire food granules constituting the cat food have a hardness of 2.5 kgw or less immediately after being immersed in a dilute hydrochloric acid (pH of 2.5) at 25° C. for 10 minutes.

9. The cat food according to claim 1, wherein the cat food includes cereals, meats, fish and shellfish, and vitamins and minerals, and the cat food includes 0 to 9 parts by mass of fiber source with respect to a total of 100 parts by mass of the cereals, the meats, the fish and shellfish, and the vitamins and minerals.

10. The cat food according to claim 1, wherein the cat food includes cereals, meats, fish and shellfish, and vitamins and minerals, and the cat food includes 0 to 3 parts by mass of fiber source with respect to a total of 100 parts by mass of the cereals, the meats, the fish and shellfish, and the vitamins and minerals.

11. The cat food according to claim 1, wherein the cat food includes cereals, meats, fish and shellfish, and vitamins and minerals, and the cat food includes 1% by mass or less of lignocellulose with respect to a total of 100 parts by mass of the cereals, the meats, the fish and shellfish, and the vitamins and minerals.

\* \* \* \* \*